United States Patent Office 3,686,161
Patented Aug. 22, 1972

3,686,161
METHOD OF SEPARATING
LIGNOSULFONIC ACIDS
Leif Jantzen, Oslo, Norway, assignor to Arthur C. Trask & Sons (a copartnership composed of Arthur C. Trask, R. Hugh Trask, and Eugene A. Trask)
No Drawing. Filed Mar. 9, 1970, Ser. No. 17,950
Int. Cl. C07g 1/00
U.S. Cl. 260—124 R                                8 Claims

ABSTRACT OF THE DISCLOSURE

A method of separating alpha high molecular weight lignosulfonic acids from an aqueous liquid such as sulfite liquor from a sulfite paper pulp process containing these acids which comprises treating the liquid with aldehyde treated tanned hide for a time sufficient to combine chemically the acid with the aldehyde hide and removing the acid therefrom by treating with an aqueous alkali. After the alpha acids have been removed the aldehyde hide is usable for removing beta low molecular weight lignosulfonic acids from the remaining liquid.

---

This invention relates to methods of separating lignosulfonic acid from aqueous liquids containing these acids.

The sulfite paper pulp process is widely used in treating lignocellulose compositions for producing paper. The sulfite liquor which is a by-product of this process ordinarily contains from about 10–14% solids materials as it comes from the digesters. A typical analysis of these solids is about 65% lignosulfonic acids, about 25% sugar, and about 10% inorganic material.

The lignosulfonic acids are two general types commonly called high molecular weight or alpha-lignosulfonic acids and low molecular weight or beta-lignosulfonic acids. The beta acids contain most of the sulfonic acid groups and generally make up about one-third of the total amount of lignosulfonic acids present.

The high and the low molecular weight lignosulfonic acids ordinarily have different uses and different chemical characteristics. It has therefore long been known that a separation of the alpha and beta acids is desirable from a commercial standpoint. However, no satisfactory method of economically separating these acids, particularly on a commercial basis, has heretofore been proposed except for the method disclosed in my prior Pat. No. 2,838,483 of June 18, 1958 which discloses the removal of lignosulfonic acids from liquids by contacting the liquids with ordinary tanned hide, and particularly with chrome tanned hide.

One of the features of this invention is to provide an improved method of separating alpha-high molecular weight lignosulfonic acids and beta-low molecular weight lignosulfonic acids from an aqueous liquid containing a mixture thereof which comprises contacting said liquid with aldehyde treated tanned hide for a time sufficient to combine chemically said alpha acids with the aldehyde hide, washing said aldehyde hide with an alkali to remove the alpha acids therefrom and activate the aldehyde hide for reaction with the beta acids, again contacting said liquid from which the alpha acids have thus been substantially removed with the aldehyde hide for a time sufficient to combine chemically said beta acids with the aldehyde hide, and removing the beta acids therefrom by treating with an alkali.

Another feature of the invention is to provide an improved method of separating alpha-high molecular weight lignosulfonic acids from an aqueous liquid containing said acids comprising treating said liquid with aldehyde hide containing basic amino groups for a time sufficient to combine chemically said acid with the aldehyde hide, and removing said acids therefrom by treating with an aqueous alkali.

A further feature of the invention is to provide an improved method of separating lignosulfonic acids from waste sulfite liquor containing sugars, comprising contacting said liquor with aldehyde hide containing basic groups for a time sufficient to combine chemically said acids with the aldehyde hide, separating the substantially acid-free liquor from the aldehyde hide containing the chemically combined acids and regenerating said acids by treating the hide with an alkali.

A more specific feature of the invention is to provide a method of separating alpha-high molecular weight lignosulfonic acids and beta-low molecular weight lignosulfonic acids from each other and from an aqueous liquid containing a mixture of these acids which comprises contacting the liquid with aldehyde hide for a time sufficient to combine chemically the alpha acids with the aldehyde hide, washing the hide with an alkali to remove the alpha acids therefrom, again contacting the liquid with the aldehyde hide for a time sufficient to combine chemically the beta acids with the aldehyde hide and removing the beta acids therefrom in the same way.

Other features and advantages of the invention will be apparent from the following detailed description of the invention.

The aldehyde hide referred to herein is prepared by treating the tannned hide with a water solution of water soluble aldehyde having a reactive aldehyde group, and the aldehyde may be either aliphatic or aromatic. Examples of usable aldehydes are the well known aliphatic mono and poly aldehydes of which formaldehyde, acetaldehyde, glutaric dialdehyde (otherwise known as glutaraldehyde) and the like are typical. Glutaraldehyde which is the dialdehyde of glutaric acid is preferred because it is readily available, inexpensive, easy to handle in a commercial process and highly effective.

The tanned hides that may be treated with the aldehyde solution to produce the aldehyde hide may be any dehaired and pickled hides from any part of the animal skin. It may also be chrome shavings, chrome splits, chrome tanned leather trimmings and in general any kind of hide substance or leather that contains free basic groups for reacting with the aldehyde in the subsequent aldehyde treatment.

In the process of this invention the liquid, which is preferably the sulfite liquor from the pulp digester, is contacted with finely divided aldehyde hide for a time sufficient for the high molecular weight alpha acids to combine chemically with the aldehyde hide. The chemically combined alpha acids are then removed by washing the aldehyde hide with an aqueous alkali solution. This separates the acids from the aldehyde hide in the form of salts and produces hydroxyl groups in the aldehyde hide.

The treated liquid from which the alpha acids have been thus removed is then again contacted with the thusly treated aldehyde hide such as by circulating liquid over the aldehyde hide. This contact is maintained for a time sufficient to react substantially all of the beta-low molecular weight acids with the aldehyde hide. These low molecular weight acids are then removed from the aldehyde hide by washing with an aqueous alkali solution. The beta acids are thus also removed as the salt.

The aldehyde hide is then returned to a condition chemically for reuse in separating alpha and beta acids by washing with an aqueous acid solution. The thusly treated aldehyde hide may then be used in the manner described for separating the acids from each other and from a fresh supply of liquid.

I believe that the water soluble aldehyde reacts with the basic groups of the hide substance without disturbing the activity of the basic or $NH_4OH$ groups. Thus, these groups are still available to hold the alpha lignosulfonic acids and the beta lignosulfonic acids in the separation process. The importance of this invention appears to be that the hide substance after treatment with the aldehydes as described is considerably more resistant to chemical attack and degradation by the successive acid and alkali contacts which are encountered in the practicing of the invention and separating the lignosulfonic acids from their environment and from each other. This, however, is theory only and the invention should not be restricted to this or any other theory of operation.

This invention, therefore, is useful and economically practical for separating from an environment such as waste sulfite liquor alpha lignosulfonic acids, beta lignosulfonic acids and these acids from each other. By removing the acids they are, of course, separated from the salts and the sugars present in the sulfite liquor and similar environments.

As can be seen, the process of this invention is economical and is rapid in its operation. Furthermore, the process lends itself readily to continuous selective separation of the alpha acids and the beta acids from a liquid containing a mixture of these acids, and the aldehyde treated hide has extremely long life in spite of the repeated alternate acid and alkali contacts. In the case of sulfite liquor from the paper pulp process, the alpha acids may be first removed in this manner and then the beta acids may be removed. The sugars may then be separated from the inorganic matter by fermentation of the sugars with any of the many well known fermenting agents in the customary manner, or by any other well known sugar removing methods.

The raw hide substance is not usable in the process set out herein because in reacting with the acids in an aqueous solution the raw hide also takes up water and this water causes the hide to swell which hinders the penetration and reaction of the ligno-acids. Furthermore, the raw hide purifies quite easily. However, when the hides have been tanned with any of the ordinary mineral tanning agents and then treated as described with an aqueous aldehyde solution the resulting aldehyde hide contains basic groups that are free to react so that about 2–5 parts by weight of the aldehyde hide will take up or react with 1 part by weight of high molecular weight or alpha lignosulfonic acids.

The reaction of the high molecular weight lignosulfonic acids with the aldehyde hide appears to be based upon an ion exchange. Thus, the alpha acids replace any other acid with a lower molecular weight which may be connected to the basic groups of the aldehyde hide.

When the liquid containing the mixed alpha and beta lignosulfonic acids is contacted with aldehyde hide by filtering the liquid through the aldehyde hide substance, substantially all of the high molecular weight or alpha acids will be taken up or reacted. If the amount of aldehyde hide and alpha acids are at the ratio of about 2 to 1 by weight, substantially none of the low molecular weight or beta acids will react with the aldehyde hide. When almost all of the high molecular weight acids have been bound up in the aldehyde hide, the filtrate contains almost only the beta or low molecular weight lignosulfonic acids together with the other sulfite liquor materials such as the sugars and inorganic matter. When this filtrate is then again filtered through aldehyde hide, the beta acids are absorbed so that only the sugars and the inorganic matter remain in the filtrate.

The principal differences between the high and the low molecular weight acids are shown in the following table:

| | Percent | | Average molecular weight |
|---|---|---|---|
| | S | $OCH_3$ | |
| Alpha-acid sodium salt | 4.8 | 12.57 | 14,690 |
| Beta-acid sodium salt | 9.6 | 8.22 | 5,180 |

The mechanics of the various reactions are believed to be as follows: when the aqueous mixture of alpha acids and beta acids such as the waste sulfite liquor is passing through the finely divided aldehyde hide, the high molecular weight acids from the liquor replace the anions which are connected to the ammonium groups in the collagen or protein molecule. As soon as the high molecular weight or alpha acids have been thusly removed from the liquor, the aldehyde hide is washed with an aqueous alkali solution such as a solution of ammonium hydroxide. The alkali removes the alpha acids from the aldehyde hide in the form of ammonium lignosulfonate which is replaced by the hydroxyl groups from the alkali connected to the basic groups of the aldehyde hide. In this condition the aldehyde hide is basic and will have to be activated by an acid. The acid liquid from which the alpha acids have been removed in the above described manner is then recirculated through the thusly treated finely divided aldehyde hide, so that the beta acids which now have the highest equivalent weight in the liquid react to become chemically bound to the basic groups in the collagen or protein molecule. Thus the beta acids are removed from the liquid. The beta acids are then separated from the aldehyde hide by again treating the aldehyde hide with an alkali such as ammonium hydroxide.

The aldehyde hide is then reactivated for reuse in a subsequent separation process by treating it with a dilute acid, preferably an aqueous solution of sulfur dioxide.

In a typical example of practicing this invention 1000 pounds of finely divided dehaired, limed, baited and pickled animal skins were treated with 100–120 pounds of a 25% glutaric dialdehyde solution in water for about 6 hours, which is the minimum time. The thusly treated hides were then suspended and air dried for 24 hours in air at 90° C. At the end of this time they were found to have a water content of about 2%. The treated hides could be easily cut to a finely divided state with the resulting particles being between 6 and 32 mesh of Tyler standard screen size. This aldehyde treated tanned hide was then used to separate lignosulfonic acids from waste sulfite liquor in the following manner.

One thousand pounds of waste sulfite liquor containing 400 pounds of alpha-lignosulfonic acids and about 200 pounds of beta-lignosulfonic acids were circulated through the particles of the aldehyde hide. The liquid was then removed, the hide was rinsed with water, and a concentrated solution of ammonium hydroxide equivalent to the alpha acids present in the hide was used for the removal of the alpha acids.

After the alkali solution now containing the ammonium salt of alpha-lignosulfonic acid had been removed from the aldehyde hide, the aldehyde hide was again contacted by the liquor which was recirculated over the aldehyde hide until substantially all of the beta acids had been taken out. The aldehyde hide was again treated with the ammonium hydroxide solution until substantially all of the beta acids had been separated from the aldehyde hide. The aldehyde hide was then treated with a dilute aqueous solution of sulfur dioxide to return the aldehyde hide to its initial condition.

The chief advantage of the method of this invention, where the aldehyde hide is used for separating lignosulfonic acids, is that the aldehyde hide can be used repeatedly in successive cycles for removing alpha and beta lignosulfonic acids in the manner described from successive batches of liquor. Thus the glutaric dialdehyde treated hide has been used for 1500 cycles and more without any material change in the properties of the aldehyde hide to absorb lignosulfonic acids as described. This is at least 10 times greater than the best results achieved previously with the prior finely divided chrome leather ion exchange agents. The economic advantages of the method of this invention are therefore obvious.

In another variation the alpha acids can be precipitated from a mixture of alpha and beta acids by using any product capable of precipitating the alpha acids. The low molecular part of the filtrate or beta acids can then be separated from the filtrate and concentrated by the use of aldehyde hide in the process described above.

In still another variation the alpha acids may be precipitated with water soluble proteins and this product, ligno-glutin, may be used as such. The beta acids may then be separated by the use of aldehyde hide in the manner described.

Having described my invention as related to the embodiments set out herein, it is my intention that the invention be not limited by any of the details of description, unless otherwise specified.

I claim:

1. The method of separating alpha-high molecular weight lignosulfonic acids and beta-low molecular weight lignosulfonic acids from an aqueous liquid containing a mixture thereof, which comprises contacting said liquid with tanned hide pre-treated with an aqueous solution of a water soluble aldehyde, said contacting being for a time sufficient to combine chemically said alpha acids with the aldehyde hide, then washing said aldehyde hide with an alkali to remove the alpha acids therefrom and activate the aldehyde hide for reaction with the beta acids, again contacting said liquid from which the alpha acids have thusly been substantially removed with the aldehyde hide for a time sufficient to combine chemically said beta acids with the aldehyde hide, and removing the beta acids therefrom by treating with an alkali.

2. The method of claim 1 wherein said aqueous liquid is sulfite liquor from a sulfite paper pulp process in an amount of about 2–5 parts by weight of the aldehyde hide per part of alpha acids, and said hide with the acid in each instance is washed with an alkali to remove the acid.

3. The method of claim 2 wherein said aldehyde hide is treated with an aqueous acid solution after said removal of said beta acids to prepare the hide for a subsequent selective separation of alpha and beta acids.

4. The method of claim 1 wherein said tanned hide contains basic groups.

5. The method of separating alpha-high molecular weight lignosulfonic acids from an aqueous liquid containing said acids comprising treating said liquid with tanned hide pre-treated with an aqueous solution of a water soluble aldehyde, said contacting being for a time sufficient to combine chemically said acids with the aldehyde hide, and removing said acids therefrom by treating with an aqueous alkali.

6. The method of claim 5 wherein said aldehyde hide contains basic amino groups.

7. The method of separating lignosulfonic acids from waste sulfite liquor containing sugars, comprising: contacting said liquor with tanned hide pre-treated with an aqueous solution of a water soluble aldehyde, said hide containing basic groups and said contacting being for a time sufficient to combine chemically said acids with the aldehyde hide; separating the substantially acid free liquor from the aldehyde hide containing the chemically combined acids; and regenerating said acids by treating the aldehyde hide with an alkali.

8. The method of claim 7 wherein said alkali treating comprises washing said hide with ammonium hydroxide solution.

References Cited

UNITED STATES PATENTS 2,838,483   6/1968   Jantzen _____ 260—124 R

JOSEPH REBOLD, Primary Examiner

D. R. PHILLIPS, Assistant Examiner